(12) United States Patent
Bradley et al.

(10) Patent No.: US 6,722,081 B1
(45) Date of Patent: Apr. 20, 2004

(54) PLANT CONTAINER LINERS

(75) Inventors: Peter Kee Bradley, Greymouth (NZ); Perry Just, Westland (NZ)

(73) Assignee: The Christian Church Community Trust, Westland (NZ)

( * ) Notice: Subject to any disclaimer, the term of this patent is extended or adjusted under 35 U.S.C. 154(b) by 0 days.

(21) Appl. No.: 09/856,213

(22) PCT Filed: Nov. 30, 1999

(86) PCT No.: PCT/NZ99/00201

§ 371 (c)(1),
(2), (4) Date: May 18, 2001

(87) PCT Pub. No.: WO00/32392

PCT Pub. Date: Jun. 8, 2000

(30) Foreign Application Priority Data

Nov. 30, 1998 (NZ) .................................................. 333069
Jun. 15, 1999 (NZ) .................................................. 336300

(51) Int. Cl.[7] ................................................. A01G 9/02
(52) U.S. Cl. ............................. 47/65.7; 47/65.8; 47/67
(58) Field of Search ........................... 47/65.8, 67, 65.7

(56) References Cited

U.S. PATENT DOCUMENTS

| | | | | |
|---|---|---|---|---|
| 2,723,169 A | * | 12/1955 | Spengler et al. ................ | 47/78 |
| 2,848,842 A | | 8/1958 | Tennant, Jr. | |
| 3,110,128 A | * | 11/1963 | Collins .......................... | 47/5.5 |
| 3,187,463 A | | 6/1965 | McCollough et al. | |
| 3,818,633 A | | 6/1974 | Sable | |
| 3,870,583 A | * | 3/1975 | Gidge ......................... | 156/219 |
| 3,958,365 A | * | 5/1976 | Proctor ........................ | 47/65.5 |
| 4,342,807 A | * | 8/1982 | Rasen et al. ................. | 428/180 |
| 4,414,776 A | * | 11/1983 | Ball ............................. | 47/56 |
| 5,018,300 A | | 5/1991 | Chiu | |
| 5,101,594 A | * | 4/1992 | Ahm ............................ | 47/56 |
| 5,171,390 A | | 12/1992 | Travers | |
| 5,226,255 A | * | 7/1993 | Robertson ..................... | 47/56 |
| 5,363,592 A | | 11/1994 | Weder et al. | |
| 5,454,191 A | * | 10/1995 | Mayeda et al. .............. | 47/65.8 |
| 6,318,022 B1 | * | 11/2001 | Just ............................. | 47/66.7 |
| 2002/0007590 A1 | * | 1/2002 | Just ............................. | 47/65.7 |
| 2003/0182857 A1 | * | 10/2003 | Just ............................. | 47/65.7 |

FOREIGN PATENT DOCUMENTS

| | | |
|---|---|---|
| AU | 711582 | 4/1998 |
| AU | 60637/98 | 10/1998 |
| CL | 1790/98 | 2/1999 |
| GB | 2288307 A | 10/1995 |
| NZ | 299234 A | 2/1998 |
| NZ | 314613 | 10/1998 |
| NZ | 314825 | 10/1998 |

OTHER PUBLICATIONS

Anonymous. The Beechgrove Garden Fact Sheet. Oct. 8, 1998. p. 4 of print out.*

* cited by examiner

*Primary Examiner*—Peter M. Poon
*Assistant Examiner*—Jeffrey L. Gellner
(74) *Attorney, Agent, or Firm*—Workman Nydegger

(57) ABSTRACT

A plant container liner or blank therefore includes a first layer of dry or at least substantially dried plant material and a water resistant layer. The water resistant layer may be disposed between the first layer and a second layer of plant material. An appropriate shape of the blank has a base section and an arcuate section associated with the base section. The arcuate section is adapted to fold about the base section to form a continuous wall in a three-dimensional form of the liner. In one embodiment, the blank may include a base section, one or more wall sections, and connectors in the form of extension tabs, flaps or lips. The connectors facilitate attachment of the base section and the wall section(s) together wherein, in the three-dimensional form of the liner, the extension tabs, flaps or lips overlap with each other or other portions of the blank.

13 Claims, 16 Drawing Sheets

PRIOR ART  FIG. 1
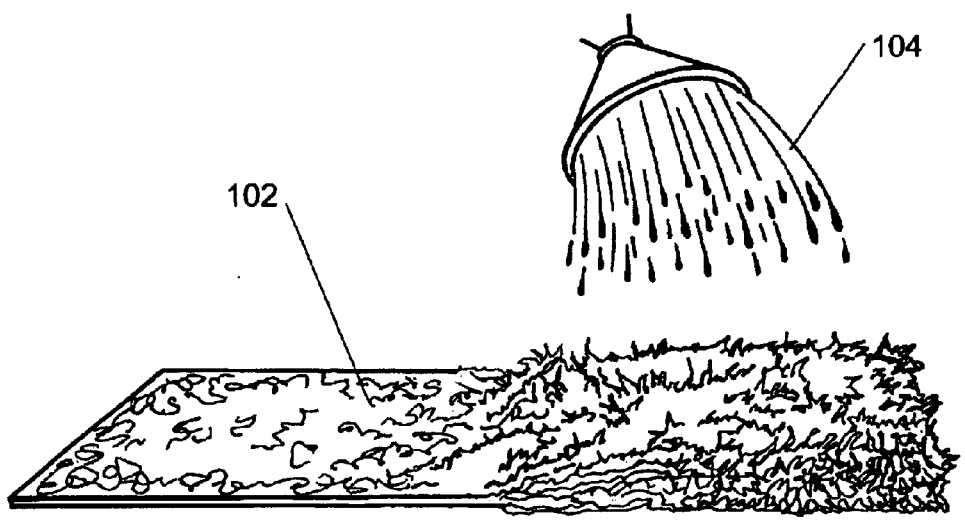
PRIOR ART  FIG. 2

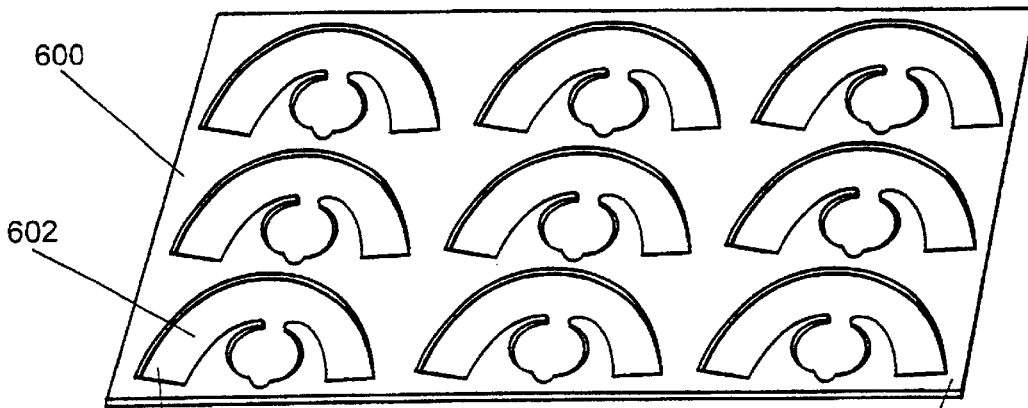
FIG. 6
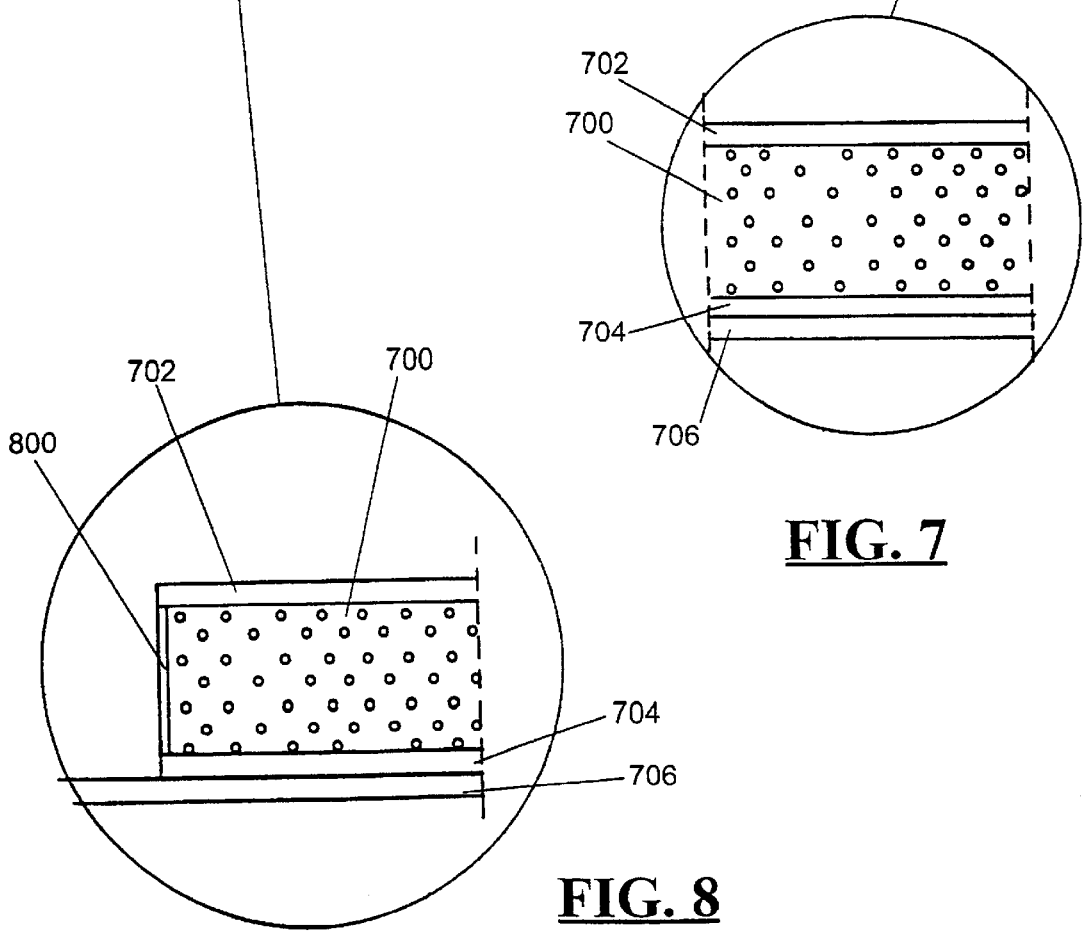
FIG. 7
FIG. 8

FIG. 10
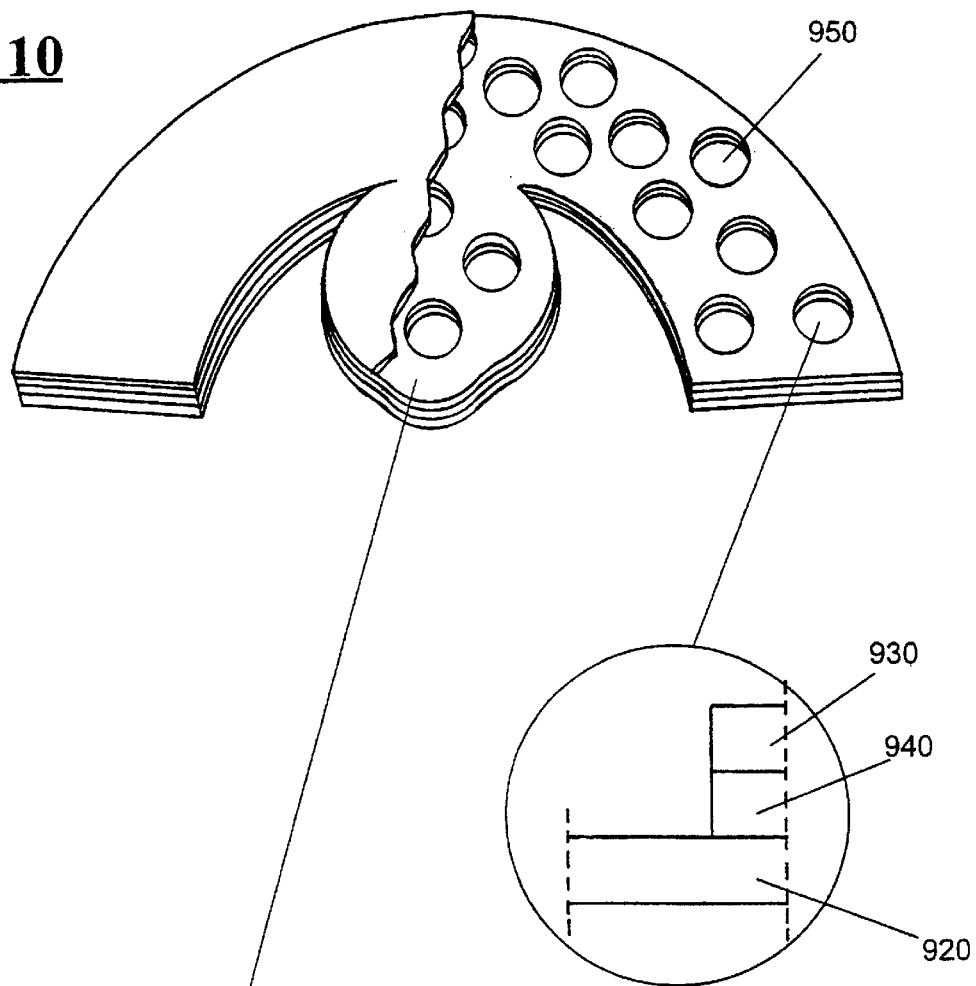
FIG. 11
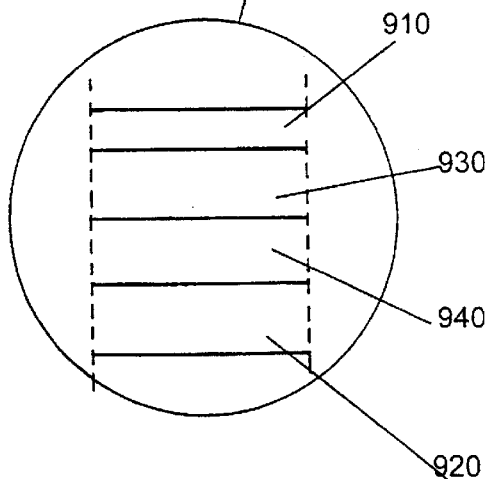
FIG. 12

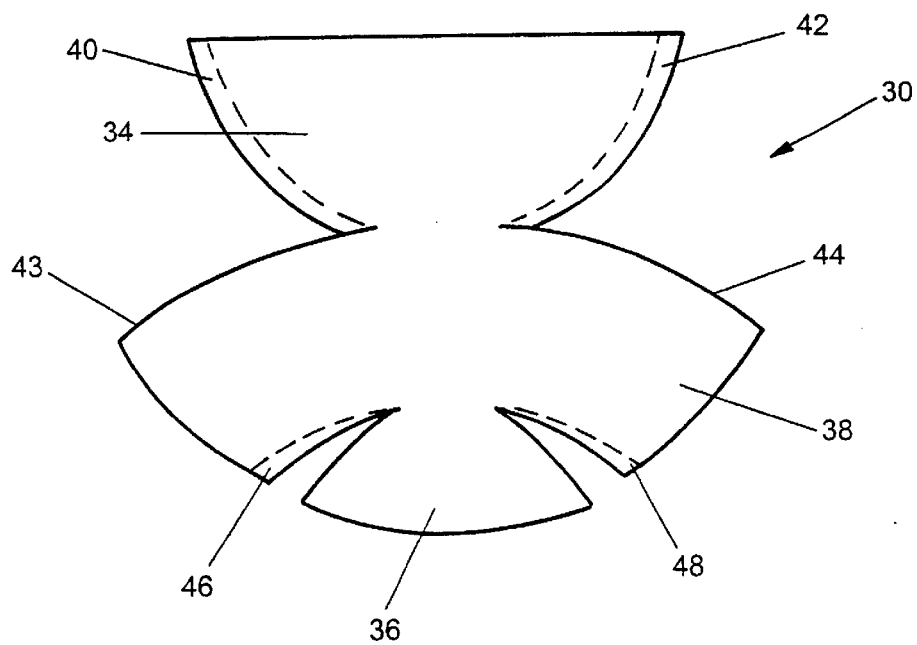
FIG. 26
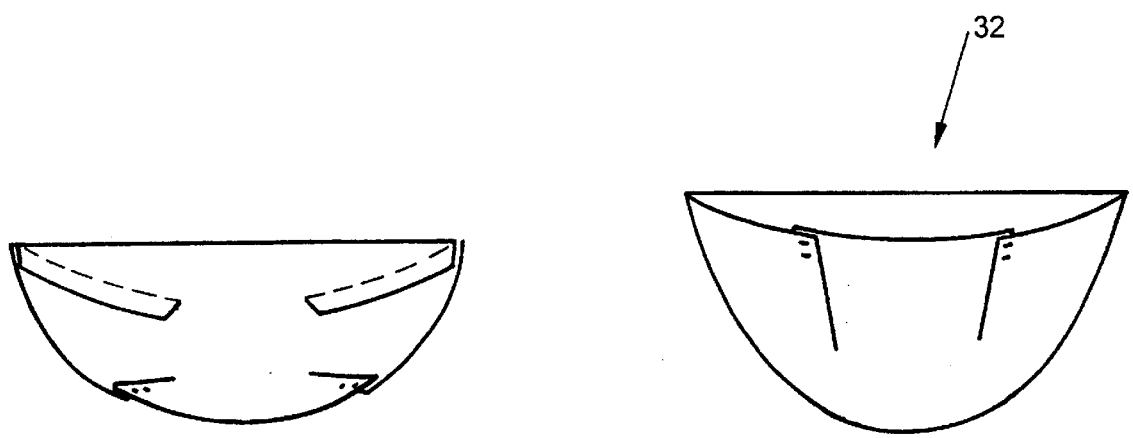
FIG. 27     FIG. 28

PLANT CONTAINER LINERS

FIELD OF THE INVENTION

This invention relates to plant container liners and a method of manufacturing plant container liners or blanks therefor. In particular, although not exclusively, the invention relates to a method of forming sphagnum moss liners for plant containers such as hanging baskets, especially those baskets in the form of skeletal containers. While the specification refers primarily to the use of sphagnum moss, the principles of the invention may be extended to other vegetative fibre materials such as coconut fibre.

BACKGROUND OF THE INVENTION

Because of its unique water retaining properties, and pleasant appearance as a natural plant substance, sphagnum moss has traditionally been a favoured material for use in conjunction with floral arrangements and related horticultural activities.

Traditionally, sphagnum moss has been sold mostly in a dried state but sometimes in a wet state, but generally in a natural loose form in which each filament of the moss plant is separate and distinguishable.

In recent decades, a new technology has developed in the sphagnum moss industry. This is the use of pressure to compress the loose moss in a press into compact sheet form. These sheets are of various thickness, usually from 2 or 3 mm to about 7 mm. They are somewhat like cardboard in flexibility and look somewhat like particle board in texture.

In its traditional loose form, sphagnum moss has always been associated with hanging baskets. One reason for this is its particular ability to absorb and retain water up to and exceeding 20 times its own weight. Another is its natural and aesthetically pleasing appearance.

The most common traditional method of using sphagnum moss to line hanging baskets is to place some loose moss in the bottom of a wire hanging basket, then cover the moss with a little potting mix. After this the basket is gradually filled, firstly by building up the outer layer of sphagnum moss around the outside of the basket and secondly by holding it in place with a little more soil and potting mix. This process is repeated several times until the lining of sphagnum moss reaches right to the upper rim of the hanging basket.

This is obviously a very labour intensive task. For this reason it has mostly been performed at home by the enthusiastic gardener, and by staff in some garden centres. In this form, hanging baskets with a layer of sphagnum moss directly inside the wire basket can be made available only when they are filled with soil and potting mix, because it is the soil and potting mix which holds the outer lining of loose filaments of moss in place.

It is evident that there is an extremely limited scope for selling sphagnum moss lined hanging baskets in this form. The labour content in filling them is very high. In addition the basket would need to be regularly watered to keep the potting mix and the sphagnum moss moist.

For these reasons, sphagnum lined hanging baskets filled in this way would normally have to be made and sold in the same garden centre. Such articles could not be manufactured on a large scale using technology and production machinery and then transported in bulk nationally and internationally to many retail outlets. Consequently only very small numbers of such sphagnum lined baskets are made up in this way.

One company in USA has taken a step forward in this regard and created a sphagnum moss lined hanging basket which can much more readily be transported in cartons as freight, or even posted in the mail, which makes them much more marketable than the previously mentioned type. In these, filaments of loose dry sphagnum moss are fixed onto the outside of the basket with very fine filament or wire. This means that no soil or potting mix is needed to hold the sphagnum moss in place.

However, the process of sewing the filaments or moss onto the outside of the basket is very time consuming and keeps this type of moss lining within the category of a hand crafted item. As such, this type of liner will always be relatively expensive, limited in numbers, and therefore a speciality item.

One New Zealand company also markets a product shaped like a Maltese cross. When placed inside a hanging basket, the edges fold up and contour to the shape of the basket. A disadvantage of a liner in this form is that initially at least, the liner does not conform satisfactorily to the shape of the curved hanging basket.

Common features of known compact sphagnum liners are:

1 They are both presented to the public in flat, one dimensional form.
2 Both must be placed inside a hanging basket before they can assume and retain the three dimensional shape of the basket.
3 Both are in untreated compacted sheet form and bear little resemblance to sphagnum moss.
4 Both have to be assembled by the purchaser according to instructions supplied.

Extensive market research conducted on our behalf concerning basket liners made up of flat sections of compacted sphagnum moss shows that unless there has been a considerable amount of prior instruction and education, a large proportion of the general public and the gardening public are not aware that:

such flat shaped pieces of compacted sphagnum moss are in fact basket liners;
such a smooth surfaced, cardboard-like substance is in fact sphagnum moss.

In addition, the public needs instruction as to how such objects should be assembled into their end form as basket liners.

Consequently, expensive and extensive advertising and promotional material, and special training of shop sales persons at every point of sale has been necessary to combat the fact that many people do not know:

what such objects are and what they are for;
what they are made of;
how they are to be assembled.

In spite of all this instruction, which does increase the price unnecessarily, many people still pass them by because they do not know what they are, and do not realise how they make up into a basket liner.

As a result, these liners have been observed in sales outlets being progressively moved into obscure positions of display where they gather dust.

Moreover, the known forms of hanging basket liners will not retain moisture indefinitely and much moisture from the soil will be expirated through the liner. Furthermore, hanging basket liners formed of natural material will have a tendency to grow mould on the other surface thereof which reduces the visual appeal of the hanging baskets. Thus there has been a tendency to use the less aesthetically pleasing and less environmentally friendly plastic containers.

It is an object of the present invention to provide a plant container liner or a blank therefor, and a method of manufacturing a plant container liner/blank which will address at least some of the foregoing problems or at least provide the public with a useful choice over liners/blanks at present available.

STATEMENTS OF THE INVENTION

Accordingly, in accordance with a first aspect of the present invention, there is provided a method of forming a plant container liner or a blank therefor, the method including: forming a first layer of compressed sphagnum moss which is dry or at least partially dried; and incorporating a layer of water resistant material into the liner or blank.

In a preferred form of the invention using sphagnum moss, the moss is compressed into a sheet which when reconstituted will incorporate the layer of water resistant material. It would be desirable for the layer of water resistant material to be sandwiched within the sphagnum moss but towards the outer surface of the liner because for visual impact, concealment of the water resistant layer by a layer of sphagnum moss is desirable. This can be achieved by initially laying a thin layer of the sphagnum moss, then the water resistant layer and finally the major amount of sphagnum moss to be compressed.

It is also intended that a wide range of materials may be utilised to form the water resistant or water impervious layer. In a simple form the layer can be provided by a mat of cellulous material such as a suitable grade of paper which may or may not have surface coatings. Suitable surface coatings where provided can facilitate adhesion to the sphagnum moss and increase the water retentive characteristics of the layer.

A suitable plastic sheet may replace the sheet of cellulous material with the surface of the sheet being treated to facilitate adhesion to the sphagnum moss if desired. Aluminium foil is another desirable alternative. It may be possible to create a mechanical bond between the foil and the sphagnum moss as a consequence of deformation of the foil in association with the sphagnum moss during compression or by using a special form of foil which has surface characteristics that will enhance mechanical bonding.

In a yet further modification, the water resistant layer can be provided by treating a section of the sphagnum moss with a suitable chemical mixture so that upon heat and pressure, or pressure alone, a layer of the sphagnum moss sheet will assume characteristics resisting water penetration. For example, a plastics compound which at ambient temperatures would be in liquid form could be sprayed onto the sphagnum moss and which when subjected to heat and pressure, or pressure alone forms the required water resistant layer.

The compounds which can be used in this way are wide ranging and include thermo setting plastics material that can be applied in a liquid form. The end use to which the compressed sheet is applied would influence the material selected. For example, a layer created by tar, or a tar paper or other tar-like material would be a possibility. Cost, visual appearance and the end use to which the sheet is to be put, will all influence the selection of the material which will form the water resistant barrier.

In accordance with a second aspect of the invention, there is provided a plant container liner or a blank therefor, the liner or blank having a first layer of compressed sphagnum moss which is dry or at least partially dried such that it is reconstitutable, with a water resistant layer incorporated into the liner or blank.

Any of the features mentioned above in connection with the first aspect may be applied to the second aspect.

Accordingly in a further aspect of the invention, there is provided a sheet of processed sphagnum moss including a first layer of sphagnum moss which is dry or at least partially dried such that it is reconstitutable and a second layer of compressed sphagnum moss which is dry or at least partially dried and a water resistant layer provided between the two layers of plant material.

In accordance with yet another aspect of the present invention, there is provided a blank for a plant container liner including a base section and a unitary arcuate section associated with the base section, the arcuate section being adapted to fold about the base section to form a continuous wall in the 3 dimensional form of the liner.

It has been found that with this construction, the expansion of the moss as it absorbs water tends to close the joints thereby providing joint seals which retain the moisture but still allow a sufficient drainage to avoid stagnation problems within the plant container.

Each blank is generally of a form including a circular base section and an arcuate wall section extending around the circular base. In this way, the wall section defines a continuous wall around the circular base in the assembled form of the liner. In one form of such a blank the base section may be integrally formed with the wall section along a part of the periphery of the base, allowing the remainder of the wall section to be folded about the remainder of periphery of the base. The blank may be secured in the three dimensional form by overlapping extension areas of the base and/or the wall section and by joining together the ends of the wall section by fastening means such as staples passing through the overlapped extension areas. Where the blank is made directly in the aforementioned shape by the use of a mould, the outline of the recess of the mould suitably defines this shape.

In another form of the invention, there is provided a blank for a plant container liner including: a substantially semi-circular base section having a substantially semi-circular edge; and one or more wall sections adapted to fold about the arcuate or semi-circular edge of the base section to form with the base section, a surrounding wall in the 3 dimensional form of the liner wherein at least one of the wall sections is integrally formed with the base section along a part of the edge of the base section and is adapted to follow the contour of the semi-circular edge of the base section in the 3 dimensional form of the liner, dimensional form of the liner.

It will be appreciated that a liner of this form will be appropriate for use in a wall mounted hanging basket.

In accordance with a further aspect of the present invention, there is provided a packaged liner for a plant container, the liner being of three dimensional form with a top opening and one or more walls extending in an upstanding configuration towards the opening, the liner including one or more sheets of reconstitutable compressed sphagnum moss secured in the three dimensional form of the liner, wherein the sphagnum moss is partially reconstituted such that the wall(s) of the liner retain sufficient stiffness to be self-supporting in the upstanding configuration, the liner being enclosed in a sealed package.

Any of the liners or blanks described in the foregoing aspects of the invention may be provided with or without a water resistant layer/barrier. The barrier may be provided by a sheet of paper of suitable composition preferably having a suitable adhesive such as a PVA applied to each surface. However it is emphasised that the barrier can be provided by any suitable sheet of material, for example, a sheet of plastics material. The material may itself be a composite or layered material, for example, paper with a more impervious material provided, for example, by some waterproof substance within the paper. A wide variety of materials is intended to be encompassed within this application.

The sphagnum moss may be compressed into individual sheets (in the form of blanks), each for folding into an individual liner. An appropriately shaped mould may be used to form each of the blanks. Mould loading devices may be utilised to load a predetermined quantity of moss into the recesses of the moulds.

Alternatively, the sphagnum moss may be compressed into the form of a larger sheet so that a number of blanks may be cut from the sheet and each blank folded to form a three dimensional liner.

Some additional advantages may be realised using a water resistant layer/barrier as discussed previously. Any suitable water barrier can be incorporated and it is desirable for the water barrier to be towards the outer layer of the compressed sphagnum moss.

One form of the water barrier can be provided as an aluminium foil. In this case a small thickness of compressed sphagnum moss will be attached to what will form the outer side of the completed liner and a thicker layer of compressed sphagnum moss attached to the inner side of the aluminium foil. In the method of manufacture, the layer of aluminium foil would be placed upon a prelaid bed of sphagnum moss and a second layer of sphagnum moss placed on the foil prior to compaction. The adhesion between the sphagnum moss and foil can be created using a suitable adhesive coated onto the foil but the invention is intended to encompass any suitable means of creating a bonding between the foil and the sphagnum moss.

It may be possible to create a mechanical bond between the foil and the sphagnum moss as a consequence of deformation of the foil in association with the sphagnum moss during compression or by using a special form of foil which has surface characteristics that will enhance mechanical bonding.

It is also possible within the ambit of the present invention to provide a liner which has different water retentive characteristics. For example, in the base section and a lower part of the wall there could be a water resistant layer but in the upper section of the wall the water resistant layer may not be included.

The blanks or liners described in the foregoing aspects may be comprised of moss which is preferably pre-dried to around 18 to 20 percent moisture by weight prior to compaction into sheets. In a preferred form of the invention, the moss is compressed without any additional heat being applied. However, in countries (eg Australia) which exclude the import of any moss other than that which is certifiably free of viable seed, the moisture content of the sphagnum moss prior to the compaction may be greater to generate steam during hot-pressing to sterilise the moss. See for example New Zealand Patent Specification 314613/314825, Australian Patent Specification 6037/98 or Chile Patent Specification 1790-98, the contents of which are incorporated herein by reference. However, where possible, the cold-press method is preferred because it is believed that hot-pressing slows the rate at which the compressed sphagnum moss can be reconstituted.

For transportation it is clearly desirable to ensure that the three dimensional form of the liners are able to be nested one within the other to minimise the transportation space required in sending the liners to the point of sale outlets.

The blanks or liners described in the foregoing aspects may be comprised of moss which is preferably pre-dried to around 18 to 20 percent moisture by weight prior to compaction into sheets. In a preferred form of the invention, the moss is compressed without any additional heat being applied. However, in countries (e.g., Australia) which exclude the import of any moss other than that which is certifiably free of viable seed, the moisture content of the sphagnum moss prior to the compaction may be greater to generate steam during hot-pressing to sterilise the moss. See for example New Zealand Patent Specification 314613/314825, Australian Patent Specification 60637/98 or Chile Patent Specification 790/98, the contents of which are incorporated herein by reference. However, where possible, the cold-press method is preferred because it is believed that hot-pressing slows the rate at which the compressed sphagnum moss can be reconstituted.

In accordance with yet another aspect of the present invention, there is provided a method of forming a liner for a plant container, the liner being of three dimensional form with a top opening and one or more walls extending in an upstanding configuration towards the opening, the method including: assembling one or more sheets of reconstitutable compressed sphagnum moss into the three dimensional form of the liner; securing the sheet(s) in that form wherein the sphagnum moss is partially reconstituted such that the wall(s) of the liner retain sufficient stiffness to be self-supporting in the upstanding configuration.

The invention of assembling this compressed plant liner in a three dimensional form in our factory, (ie remote from the point of retail sale) so that it can be transported and presented in the market in this manner, makes possible the further advantage that the manufacturer can also at least partially reconstitute the surface of at least a portion of the liner, preferably by spraying the outer surface with a suitable quantity of fine water spray so that the outer surface swells up to such measure that it appears to any uninformed person as in fact being made of sphagnum moss. It is anticipated that a liner in this form will have a very instant and widespread appeal. However, the invention is not limited to partial reconstitution being performed in our factory. This step may be effected at a point of retail sale.

The degree of reconstitution of the outer surface should necessarily be limited, lest the liner soak up too much water, thereby losing its self-supporting quality and become bulky and heavy. The quantity of water for an average sized liner would be between 10 and 15 ml.

The partial reconstitution may be effected prior to or after assembling the blank to the three dimensional form. This may be achieved by spraying the liner with a suitable liquid such as water. The liquid might be coloured (eg green) to contribute a pleasing aesthetic effect to the liner. Where the liner has a base and upstanding walls, the partial reconstitution is preferably effected on the exterior of the walls. In a most preferred form of the invention, the partial reconstitution is effected to the whole exterior of the liner.

The present invention can attain some additional advantages by using a water retentive barrier within the sphagnum moss sheet. Any suitable water retentive barrier can be incorporated and it is desirable for the water retentive barrier to be disposed towards the exterior of the three dimensional liner. This will assist with the partial reconstitution. If water is sprayed onto the exterior of the three dimensional liner, then only the sphagnum moss in an outer surface layer at the exterior of the liner will reconstitute leaving the greater thickness of compressed sphagnum moss on the inside of the water retentive barrier unaffected by any moisture used for the reconstitution of the outer surface.

The present invention provides a method of manufacture for a plant liner which will ensure that at the point of sale, the purchaser is able to readily recognise that the three dimensional liner is formed as a compressed sphagnum moss liner.

In accordance with another aspect of the invention, there is provided a method of packaging liners formed according to the method set out above, the method including: enveloping a single liner or a plurality of nested liners with shrink wrapping material such that the shrink wrapping material extends into the interior of the or the top liner, weighting the shrink wrapping material with a weight placed in the interior of the or the top liner; and heat treating the shrink wrapping material to conform to the shape of the liner.

The invention consists in the foregoing and also envisages construction of which the following give examples only.

BRIEF DESCRIPTION OF THE DRAWINGS

One preferred form of the invention and modifications thereof will now be described with reference to the accompanying drawings in which:

FIG. 1 illustrates filaments of natural sphagnum moss product as harvested;

FIG. 2 illustrates the principle of reconstitution of a sheet of compressed sphagnum moss;

FIG. 6 is a perspective view of a negative mould plate;

FIG. 7 is a cross-sectional detail of the negative mould plate illustrated in FIG. 6;

FIG. 8 is a cross-sectional detail of the mould plate illustrated in FIG. 6;

FIG. 10 is a perspective/partial cross-sectional view of the positive mould member shown in FIG. 9;

FIG. 11 is a cross-sectional detail of the positive mould member illustrated in FIG. 10;

FIG. 12 is a cross-sectional detail of the positive mould member illustrated in FIG. 10;

FIG. 26 is a view of a blank for a compressed sphagnum moss liner according to another preferred embodiment of the invention;

FIG. 27 is an inside view of the liner assembled from the blank of FIG. 26;

FIG. 28 is a front view of the liner of FIG. 27;

PREFERRED EMBODIMENTS OF THE INVENTION

FIG. 1 shows filaments of harvested sphagnum moss 100. The sphagnum moss 100 is used primarily in the present invention for its water retentive property which is up to 20 times its own weight in water. The sphagnum moss 100 is also used for its aesthetic value in hanging basket arrangements. The sphagnum moss is harvested from a natural and renewable source.

Initially, some of the excess water may be removed from the freshly harvested sphagnum moss 100 through the use of a centrifuge or calender rolls. The sphagnum moss 100 is then dried either in a kiln or with natural sunlight. Preferably, the sphagnum moss 100 is dried in a kiln with a continuous conveyor (not shown), the speed of which is controllable. Suitably, an automatic feeding system (not shown) that deposits the moss onto the kiln's continuous conveyor is also provided. The kiln is in the form of a tunnel and operates to circulate heated air which is generated from hot water heat exchangers operating at a temperature as high as 140° C. The moss is gradually dried as it travels through the kiln.

After drying, the moss may be left in piles to cool and reabsorb some moisture from the atmosphere. Alternatively, additional moisture may be added to the moss through the use of pressurised water misting nozzles. The optimum moisture content of the moss prior to pressing is 18 to 20 percent by weight although a range of 14 to 17 percent by weight is commonly used. It is considered that anything in the range of 3 to 25 percent by weight will work.

Figure 9:
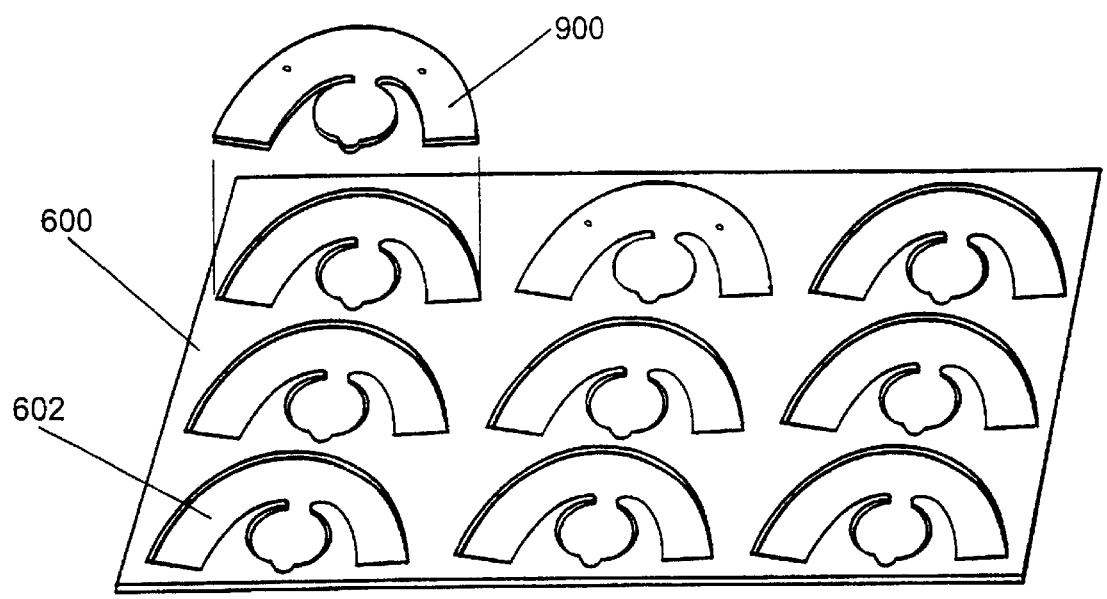
FIG. 9 is a perspective view of the negative mould plate of FIG. 6 illustrating the alignment of a cooperable positive mould member.

When an appropriate moisture content has been reached, the sphagnum moss can be compressed into sheets 102 as illustrated in FIG. 2. The sphagnum moss sheet 102 has the ability to absorb a significant quantity of water 104 and reconstitute into its substantially original state. The sheet 102 illustrated in FIG. 2 is included to provide the reader with an appreciation of the ability of sphagnum moss to reconstitute from a compressed, substantially dried state to its substantially original state. Prior to reconstitution, the sheet 102 may be cut into one or more blanks, each of which may then be assembled to form a three dimensional liner. However, in the most preferred form of the invention to be explained by the following text, the sphagnum moss is compressed directly into the form of individual blanks each of which, when assembled forms a three dimensional liner of the form illustrated in FIG. 15. FIG. 9 illustrates the general form of the mould used to form each of the blanks. The mould includes a negative mould plate 600 having a number of mould recesses 602 and positive mould members of a shape complimentary to that of the recesses. Accordingly, a mould loading device 300 (FIG. 3) is used to load sphagnum moss into the mould recesses 602.

Figure 3:
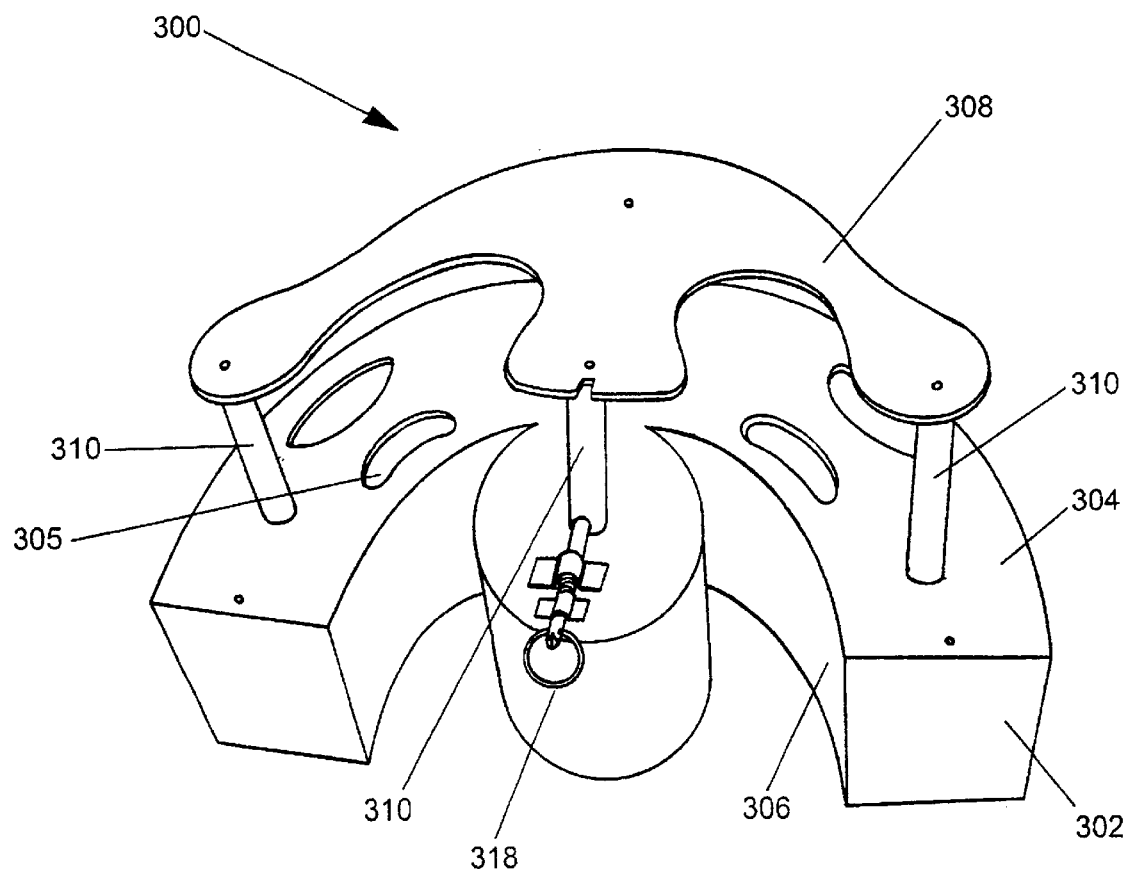
FIG. 3 is a bottom perspective view of a mould loading device according to a preferred embodiment of the present invention.
Figure 4:
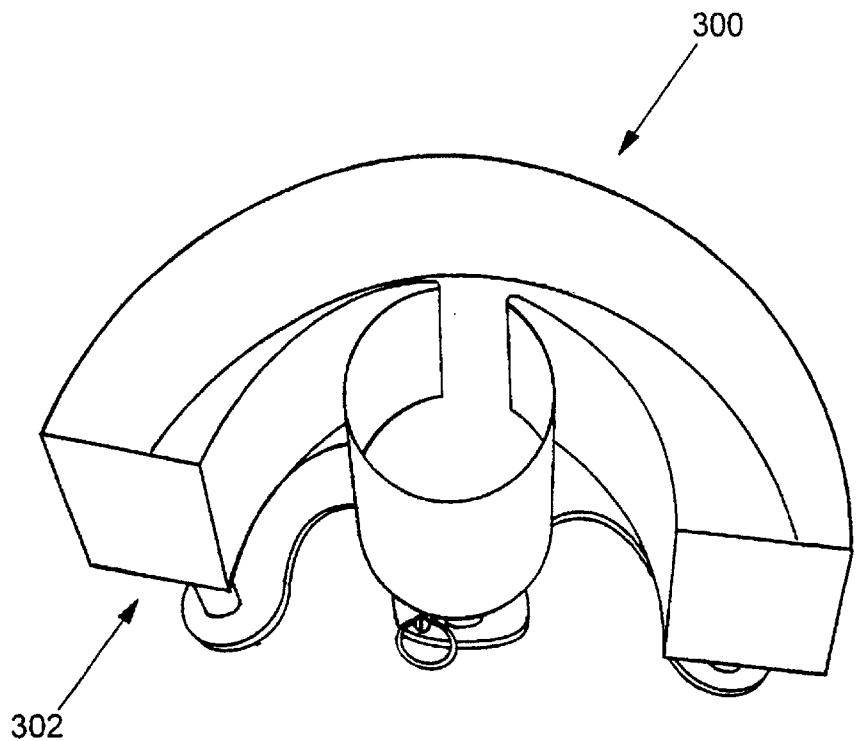
FIG. 4 is a top perspective view of the mould loading device illustrated in FIG. 3.

The mould loading device 300 comprises a filling box 302 generally conforming to the shape of the mould recess 602 to be filled. The filling box 302 shown in FIG. 3 includes a base 304 and side walls 306 but is open at the top as illustrated in FIG. 4. The base 304 includes finger slots, the reason for which will be explained.

Figure 5:
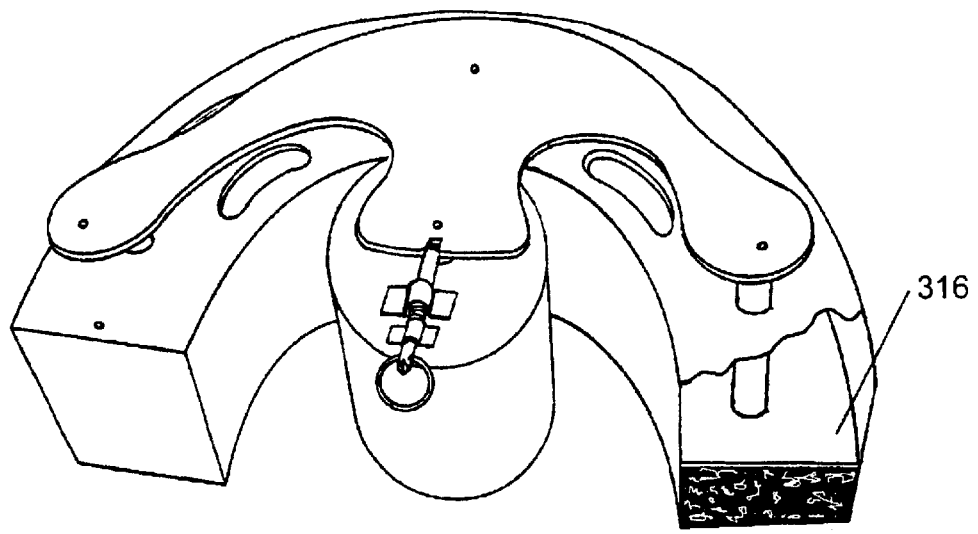
FIG. 5 is a bottom perspective view with the mould loading device in operation.

The mould loading device 300 further includes a handle portion 308 conforming only approximately to the shape of the filling box 302. Dependent from the handle portion 308 are four dowels 310 (only three of which are shown). These dowels 310 are fixed to the handle portion 308 at spaced locations but extend slidingly through apertures provided in the base 304 of the filling box 302. As can be seen in FIG. 5, the dowels 310 are attached to a false bottom 316 which is complimentary in shape to the base of the filling box. The false bottom 316 is slidable within the filling box 302 and is controlled by the handle portion. In FIG. 3, the handle portion has been pulled out as far as possible so that the false bottom 316 engages against the inside of base 304. In this configuration, the spring loaded latch 318 has a pin which extends into an aperture provided in centre dowel 310. This holds the false bottom 316 in position against the inside of base 304 during filling and tipping.

In use, the moss loading device is oriented in FIG. 4 with the handle portion 308 fully extended and the latch in position in the dowel 310. Sphagnum moss 100 is inserted into the open end of the filling box 302. Once filled, the mould loading device is weighed on electronic scales to ensure that an appropriate quantity of moss has been inserted into the filling box. Once filled to a satisfactory level, the mould loading device 300 is brought to the negative mould plate 600 (FIG. 6 or FIG. 9) and the loading device is deftly flipped over so that the opening is in register with the mould recesses 602 of the mould plate 600. To ensure adequate removal of the contents of the mould loading device 300, the latch 318 is released to allow the user to push handle portion 308 towards the base 304. The handle portion 308 is configured to enable the user to use both hands to extend around respective parts of the handle portion 308 with the users fingers inserted through the finger slots 305. Squeezing together of the portion of the base between the finger slots 305 and the handle portion 308 ensures full ejection of the sphagnum moss 100 from the filling box 302 into the mould cavity 602. Depending on the size of the filling box 302 and the predetermined correct weight of the moss in the filling box, the thickness of the moss deposited into each mould recess will be approximately 60 to 85 mm.

Figure 13:
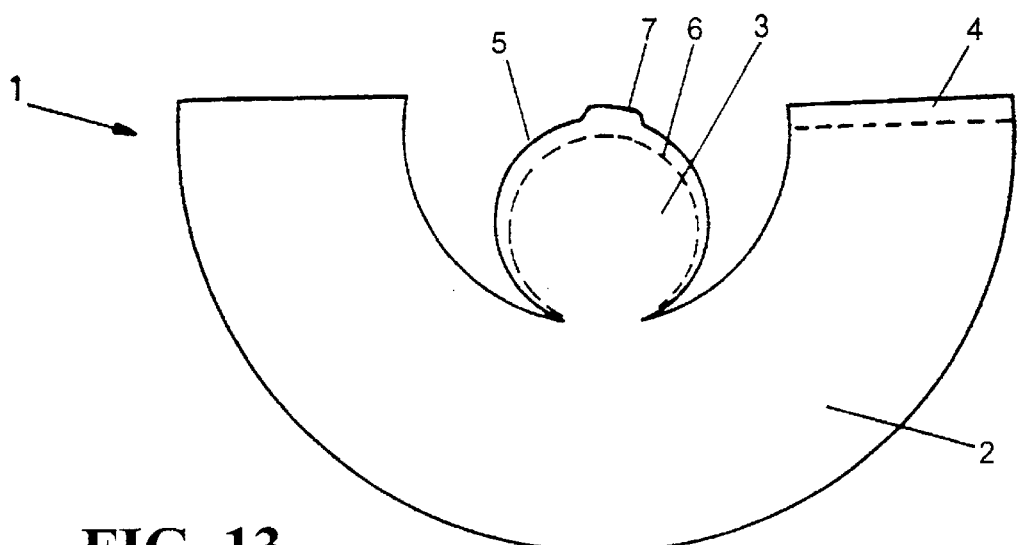
FIG. 13 is a blank of compressed sphagnum moss which may be used to assemble a plant container liner.
Figure 15:
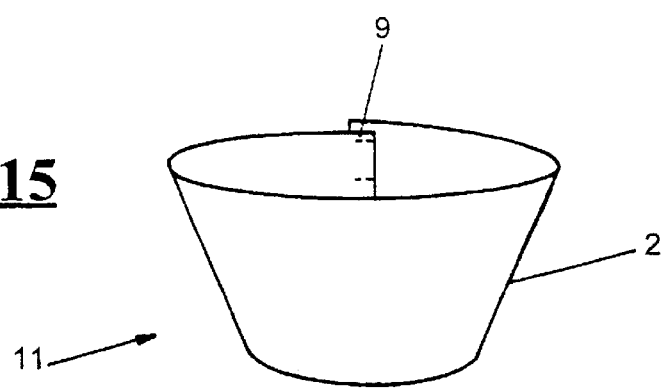
FIG. 15 is a side perspective view of the three dimensional liner shown in FIG. 14.

The negative mould plate 600 illustrated in FIG. 6 has a regular array of mould recesses 602 shaped so that the blanks produced thereby will conform to those illustrated in FIG. 13, to enable the assembly of the three dimensional liner illustrated in FIG. 15, with little if any wastage of sphagnum moss material.

The negative mould plate 600 is primarily constructed of a high density PVC foam material 700 sold under the trade mark KLEGECELL. The high density foam material 700 is sandwiched between two sheets of plywood 702, 704. The sheet 702 forms the upper surface of the mould and the sheet 704 defines the lower periphery of the high density foam material 700. A further sheet of plywood 706 is disposed to define the base of the negative mould plate 600.

The high density PVC foam material 700 is of the type commonly used in the construction of surfboards, sailboards and in general boat and yacht construction. Suitably the high density foam material should be both light and strong. The choice of plywood for the sheet 702, 704, 706 has been made because plywood is able to withstand the high pressures applied to it during the pressing process (500–3500 psi) (3.448–24.133 MPa).

All of the layers in the negative mould sheet 600, apart from the base layer 706 are cut to remove portions in the shape of the blanks to be formed by the mould recesses 602. Each of the layers 700, 702, 704 is provided with the cut outs in register with each other so that when the layers are stacked one on top of each other, the layers will define the mould recesses 602. Only the base layer of plywood 706 remains in tact and thereby defines the base of the mould recesses 602. The depth of the mould recesses can range between 35 and 90 mm depending on the application. The layers are glued together to form a laminate. The surface of the foam layer 700 defining the working surface of the mould recess 706 is provided with a fibreglass coating 800 to protect the working surface of the foam layer 700 from abrasion during pressing. The fibreglass coating 800 may include polyester, vinyl ester or epoxy resins and chop strand matt as is known to those skilled in the art of fibreglass.

The positive mould members 900 illustrated in FIGS. 9 to 12 are comprised of four sheets of plywood including a top sheet 910 of 7 mm plywood, a base sheet 920 of 12 mm plywood and two inner sheets 930, 940 of 12 mm plywood. The inner sheets of plywood 930, 940 are machined with a plurality of fairly evenly spaced apertures 950 which serves to reduce the weight of the positive mould member 900. The layers of plywood 910, 920, 930, 940 are glued together to form a laminate.

The shape of each positive mould member 900 is complimentary to the shape of each mould recess 602, except that the positive mould member 900 is smaller than the mould recess 602 so that a gap of between 2 and 3 mm is provided between the sides of the positive mould member 900 and the side wall of the mould recess 602 when the positive mould member 900 is inserted into the mould recess 602. Additionally, the positive mould members 900 are formed so as to be 5 to 10 mm thicker than the depth of the mould recesses 602. In this way, when the full pressure of the press bears on the positive moulds, no pressure will be exerted onto the top surface of the negative moulds. In view of the foam material, pressure on the negative mould plate 600 might cause it to be crushed.

In use, the mould recesses 602 of the negative mould plate 600 are filled in turn with sphagnum moss using the mould loading device 300. When all of the mould recesses 602 have been loaded with sphagnum moss, each of the positive moulds 900 is inserted into a respective mould recess 602. The assembly of the negative mould plates 600 and the positive mould members 900 is thus ready for insertion between the platens of a platen press (not shown). The press may be of a conventional type with the assembly of the mould plate 600 and mould members 900 being carried or conveyed to the press and inserted between the platens thereof, prior to the platens being brought together to compress the sphagnum moss within each of the mould recesses 602. The pressure for pressing the moss range is between 500 psi and 3800 psi (3.448–26.201 MPa) for a time ranging between 10 seconds and 3 minutes. The combination of pressure and time is such that the thickness of the blanks produced is between 2.5 and 4 mm and yet still able to reconstitute with the addition of water. This degree of compression provides the blank with sufficient rigidity to enable the walls of the assembled three dimensional liner to be self supporting. It is considered that a compressed thickness of between 1 mm and 6 mm for the stated pre-compression thickness of moss should also provide sufficient rigidity for the walls to be self-supporting.

In an alternative type press (not shown) the lower platen may be provided in the form of a table slidable into and out of the press. In this embodiment, the positive mould members are affixed to the upper platen of the press and the negative mould plate is affixed to the lower platen of the press. When the lower platen is moved into position inside the press, the mould recesses and the positive mould members are in precise alignment. With this arrangement, the negative mould plate 600 may be conveniently accessed for loading and unloading by sliding the table out of the press. In another alternative form of the press, the upper platen may be tiltable to provide increased access to the negative mould plate 600.

As illustrated in FIG. 13, the blank 1 which will be formed using the mould assembly of negative mould plate 600 and positive mould plate 900 has an arcuate wall section 2 and a circular base integrally formed with the wall section. An extension 4 at one end of the wall section 2 provides for an overlap to occur between the joining wall sections when folded about the base 3. Connecting staples 9 pass through the overlapped sections to retain the wall section of the liner assembled in the three dimensional form as illustrated in FIG. 14.

Figure 14:
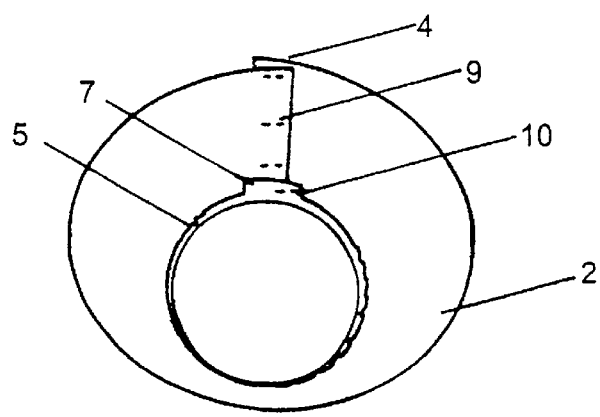
FIG. 14 is a top view of the three dimensional form of the liner assembled from the blank in FIG. 13.

The extension 5 beyond the perimeter of the base 3 indicated in dotted outline in FIG. 13 and the tab 7 can be folded up during assembly to overlap the lower periphery of the wall 2 and an attaching staple 10 passing through the tab 7 and wall of the blank will complete the assembly of the three dimensional liner 11 illustrated in FIGS. 14 and 15. Other forms of fastening are also considered within the scope of the present invention.

The compressed sphagnum moss liner 11 has the appearance of cardboard and consequently is not easily recognisable to the purchasing public as a sphagnum moss liner. To bring the surface of the sphagnum moss liners to resemble their original natural state, a fine mist of water is sprayed onto one side of the blank only, prior to assembly using a pressurised misting nozzle. This serves to at least partially reconstitute the surface layer of the blank 1 on one side. The blank 1 then passes through an air dryer in the form of a tunnel blowing a high volume of heated air to dry off any excess moisture. The blank 1 is then assembled into the three dimensional form of the liner 11 optionally through the use of the connecting staples 9 in the manner illustrated in FIGS. 14 and 15. The assembled liner will resemble that illustrated in FIG. 16 with the surface layer 11*a* of the exterior of the blank 11 reconstituted as illustrated.

Following stapling, the liners 11 have appropriate product information and advertising sheets placed in or over the liners 11 in such a manner that they contour to the curved surfaces of the liners 11.

Figure 17:
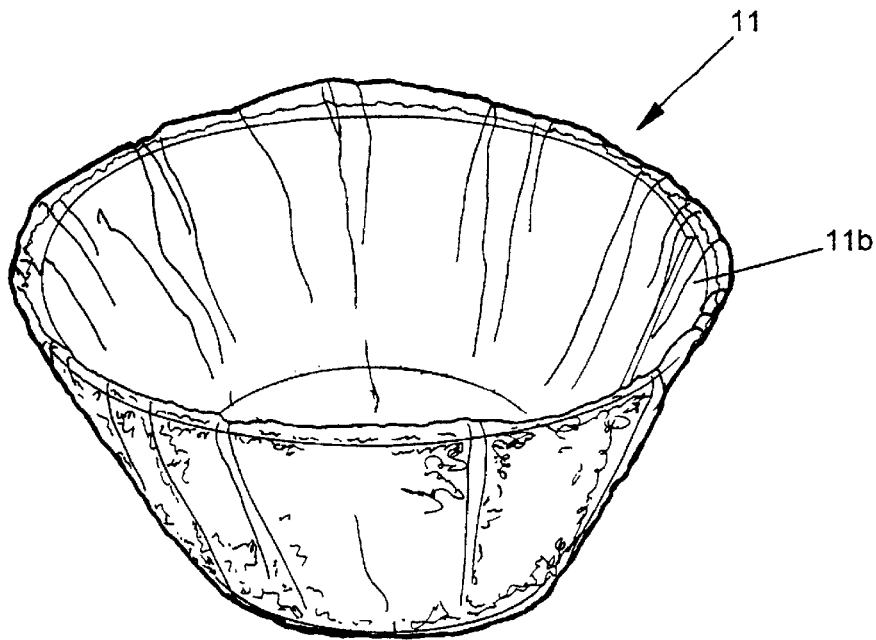
FIG. 17 illustrates the liner of FIG. 16 including a plastic shrink wrapping.
Figure 18:
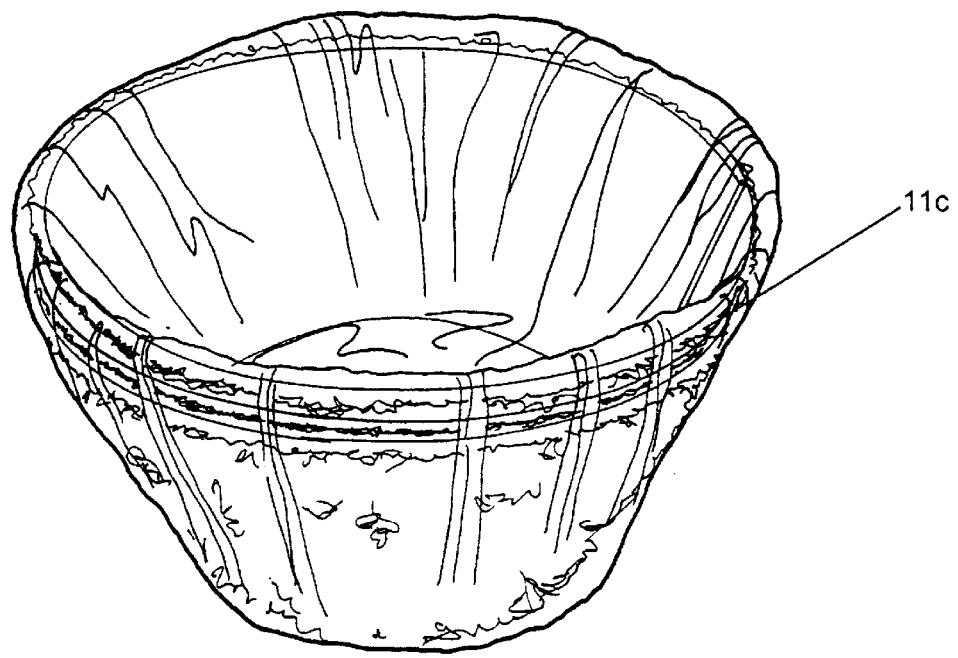
FIG. 18 is a perspective view of three liners, nested into a stack and bound by plastic shrink wrapping.

FIG. 17 illustrates the liner 11 enclosed within a bag 11*b* of shrink wrap plastic. The bag is sealed in a circular shape around the top of the liner 11, 10 to 100 mm from the top edge with a purpose built circular sealing machine. This provides a surplus of plastic which fits down inside the liner 11 against the sides and the bottom. The plastic is held in position against the sides and bottom of the liner 11 with a wire frame weighted with 1.5 kg of weights. The wire frame conforms to the inner contour of the liner 11. As the wire frame (not shown) is inserted into the liner 11, the plastic is held against the sides and bottom of the liner. Holes punched into the plastic prior to sealing enable air trapped inside the bag to escape when the wire frame is inserted into the liner. The liner 11 with the sealed bag and the weighted wire frame is passed through a shrink oven akin to a conveyor bread oven. The liner 11 and accompanying wrap is then allowed to cool, after which the weighted wire frame is removed. The result is that the plastic still lies snug against the interior and the bottom of the liner and not stretched tightly across the top of the liner 11 as would occur in conventional shrink wrapping.

The use of a circular bag with a circular sealer eliminates bunching of the plastic on the outside of the liner which would occur with the use of a square bag. Additionally, with three liners nested together and shrink wrapped as a pack of three, the shrink wrapping process has the additional benefit of compacting the liners more tightly together than prior to wrapping. This enables more three-packs to fit into a cardboard carton than a single shrink wrapped package.

Figure 19:
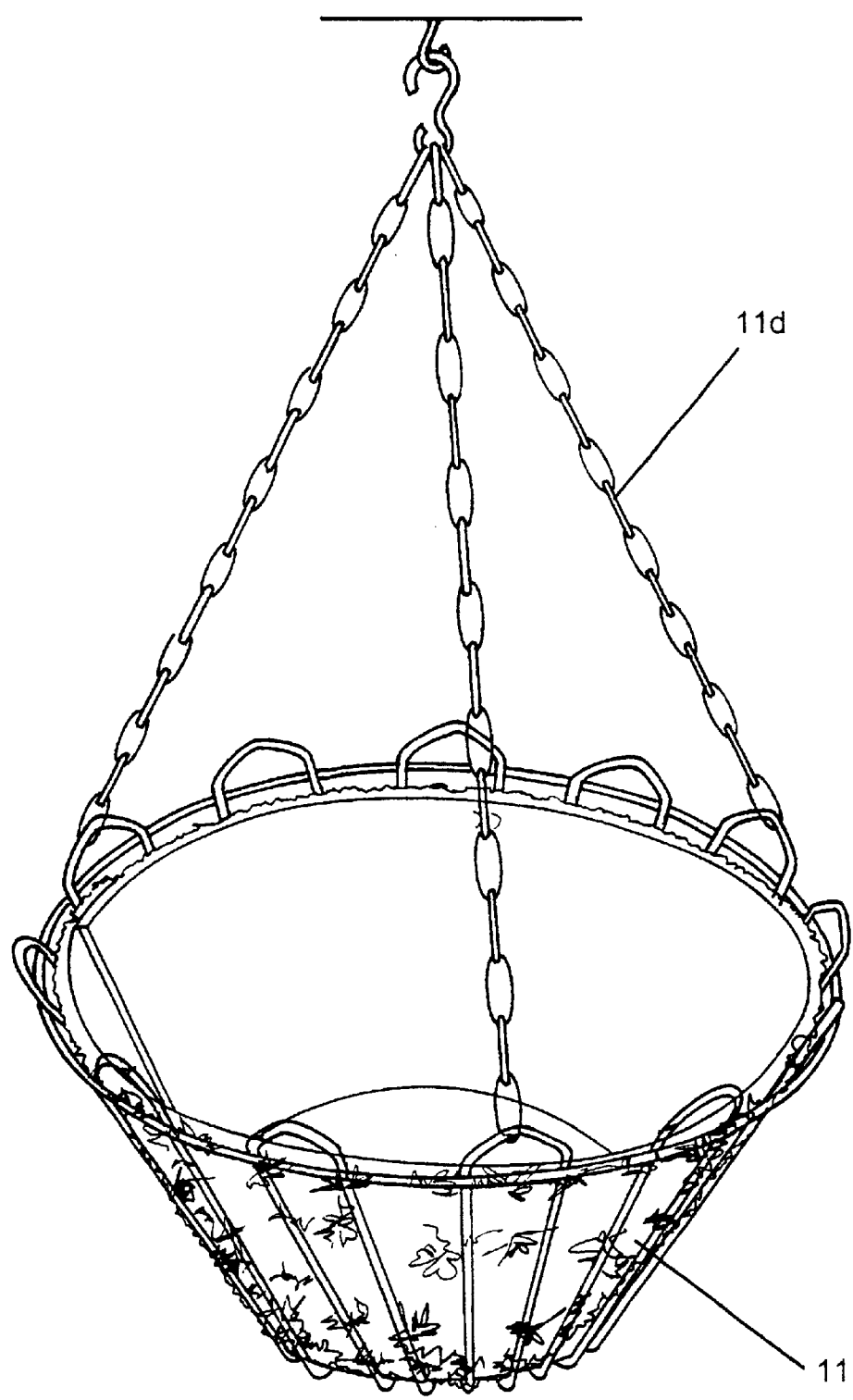
FIG. 19 is a perspective view of the liner of FIG. 16 installed in a conventional hanging basket assembly.

The intended use of the liner is illustrated in FIG. 19. As shown, the liner 11 is inserted into a conventional hanging basket assembly 11*d*. Once the liner 11 is inserted into the basket, it may be fully reconstituted by having water poured over or by being soaked in water for a matter of minutes, to enable full reconstitution to occur.

It will be appreciated that depending upon the shape of the blank, various liner shapes can be created. Generally, it is desirable that the shape is one which can allow nesting of similar shaped liners. Such nesting configurations are employed where the assembly step is performed at a site remote from the point of sale.

The foregoing generally described the assembly and packing for retail sale of a 3 dimensional liner. It will be appreciated that the blanks may also be packaged for retail sale and there will be savings in transport costs for blanks shipped in the form to the point of retail sale.

Figure 20:
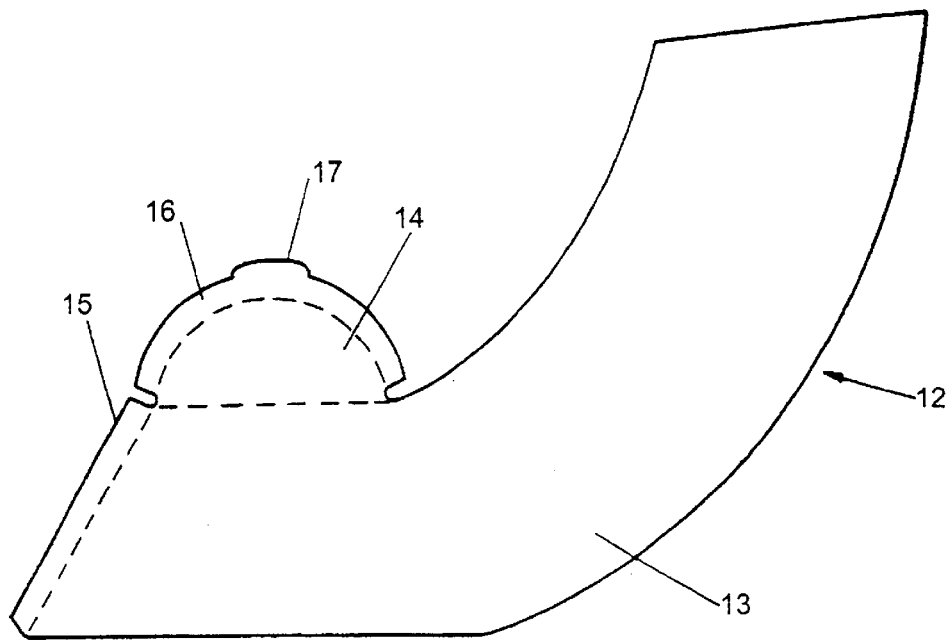
FIG. 20 is a blank of compressed sphagnum moss which may be used to assemble a modified plant container liner.
Figure 21:
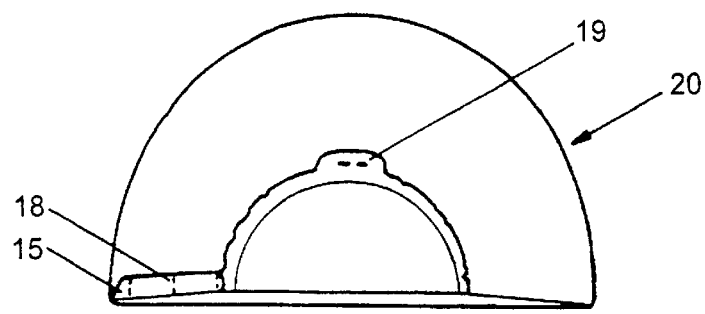
FIG. 21 is a top view of the three dimensional liner formed from the blank illustrated in FIG. 20.
Figure 22:
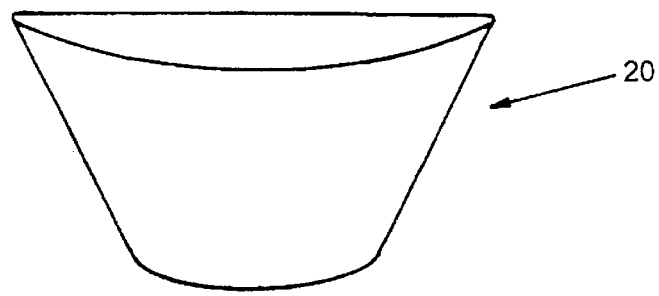
FIG. 22 is a front perspective view of the liner in FIG. 21.

An illustration of one possible modified blank and liner formed therefrom is illustrated in FIGS. 20 to 22 of the accompanying drawings. In FIG. 20 the blank 12 of compressed sphagnum moss is provided with a side wall section 13 and an integral base section 14. The shape is designed to create a three dimensional liner which, when assembled is, suitable for a plant container supported against a surface such as a wall. The overlap section 15 allows the joining ends of the wall section to be connected and the extension section 16 with tab 17 is upturned to join by way of staples 18, 19, the base in a manner similar to that previously described in connection with FIGS. 13 to 15. Optionally, the exterior of the liner 20 is then sprayed with water.

Figure 23:
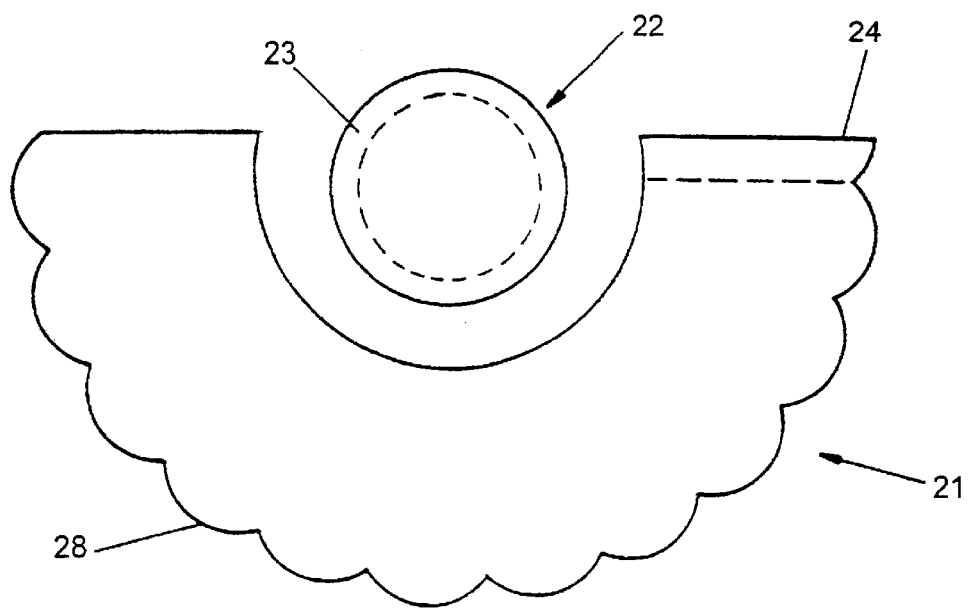
FIG. 23 is a view of a wall blank of compressed sphagnum moss and a separate base blank.
Figure 24:
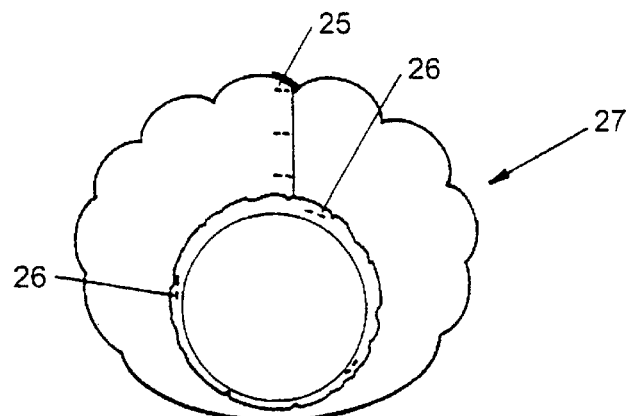
FIG. 24 shows a top view of the three dimensional liner formed from the component parts as illustrated in FIG. 23.
Figure 25:
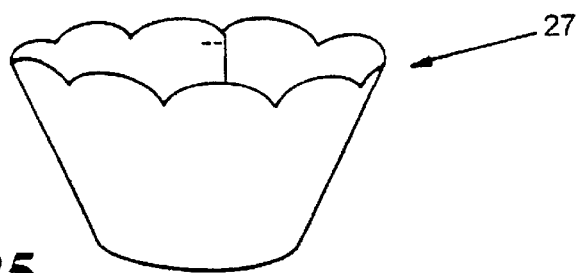
FIG. 25 is a front view of the liner illustrated in FIG. 24.

A further modification of the present invention allowing a liner to be assembled from a base and wall section is illustrated in FIGS. 23 to 25 of the drawings. A wall blank 21 of compressed sphagnum moss is provided together with a separate base member 22 having a lip 23. An overlap section 24 allows for the joining ends of the wall using staples 25. The lip 23 is upturned and then connected to the lower end of the wall with staples 26 thereby completing the three dimensional liner 27 as illustrated in FIGS. 24 and 25. The wall section 21 is shown with a scalloped upper periphery that is also produced as a scalloped finish in the assembled liner 27. Optionally, the exterior of the liner is then sprayed with water to partially reconstitute the outer surface layer.

It will be appreciated from the above description of the method of manufacture that from an outward appearance it is not easy to distinguish between a liner that has been formed to incorporate a water retentive barrier within the compressed sphagnum moss and one which does not have such a barrier. Establishing a distinctive peripheral edge such as the scalloped edge 28 could be used to provide a visual distinction indicating to a user that the liner has a water retentive barrier.

According to another embodiment of the invention, the blank 30 illustrated in FIG. 26 is assembled to form a liner 32 for inserting into a wall mounted hanging basket or container (not shown) of the kind which has a planar semi-circular back section for mounting against a supporting wall surface and a curved front wall section, generally conforming to the surface of a quarter sphere. Such baskets or containers have an open top for insertion of the plant.

The blank 30 is of integral construction, having a back section 34, a first front section 36 and a second front section 38. The back section 34 is substantially semi-circular in shape and is connected to the second front section at a central portion of its curved periphery. On the remainder of its curved periphery on either side of the central connected portion, the back section 34 is provided with overlap sections 40,42. These overlap sections are folded at approximately right angles to the back section 34 to overlap with the rear edges 43,44 of the second front section 38. Optionally, these overlap sections 40,42 could be clipped to assist with joining to the rear edges 43,44 of the second front section 38.

The first and second front sections 36, 38 are shaped so that when assembled together they will approximately conform to the shape of the surface of a quarter sphere. The two divisions between the first and second front sections 36,38 are thus in the manner of darts commonly employed in the construction of garments. At each of the two divisions between the first and second front section 36,38 are overlap sections 46, 48. These overlap sections 46, 48 overlap respective adjacent edges of the first front section 36 in the assembled configuration of the liner 32. The overlap sections 46, 48 could be clipped to assist the assembly process.

Figure 29:
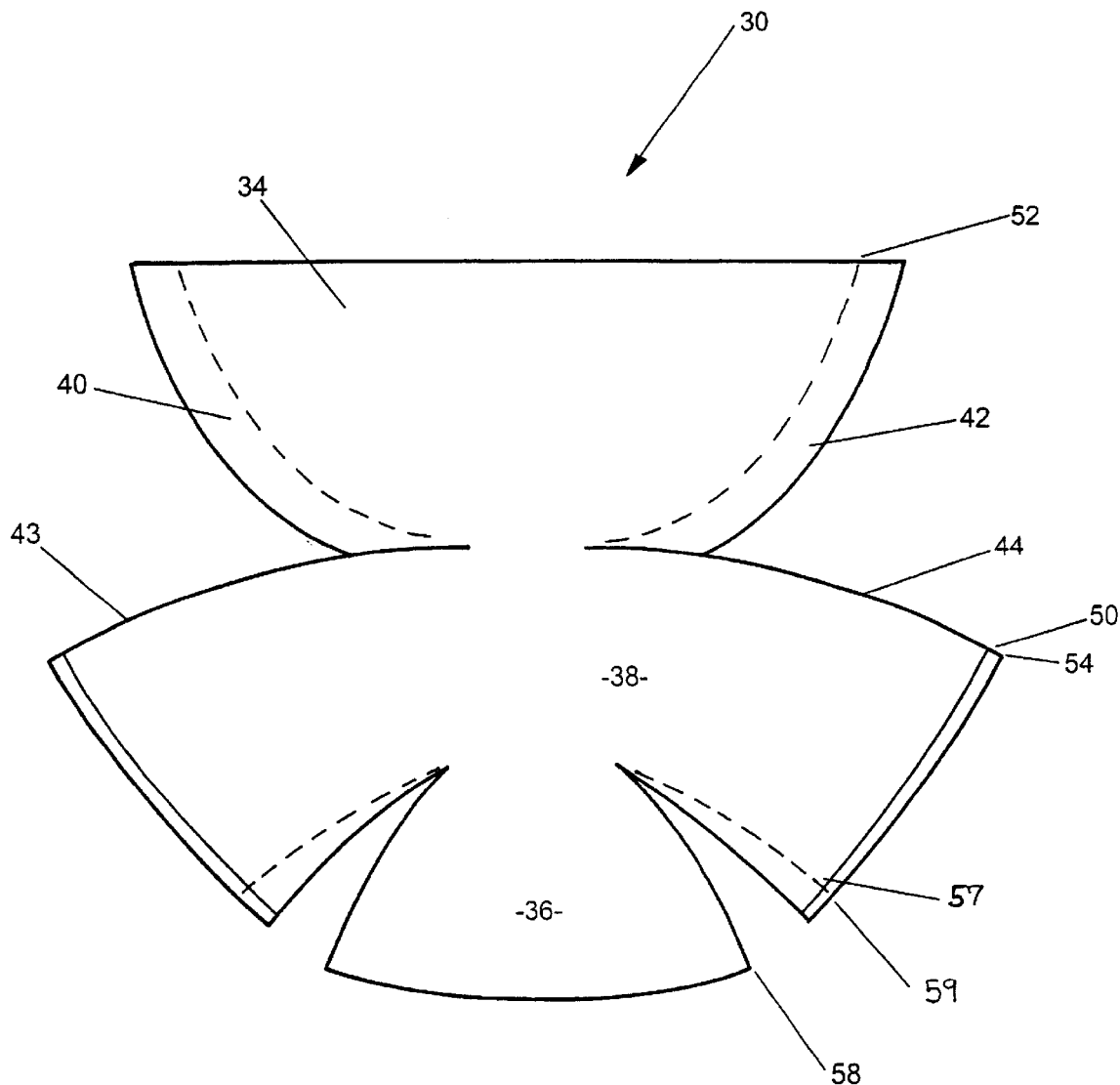
FIG. 29 is a further detailed view of the blank shown in FIG. 26.
Figure 30:
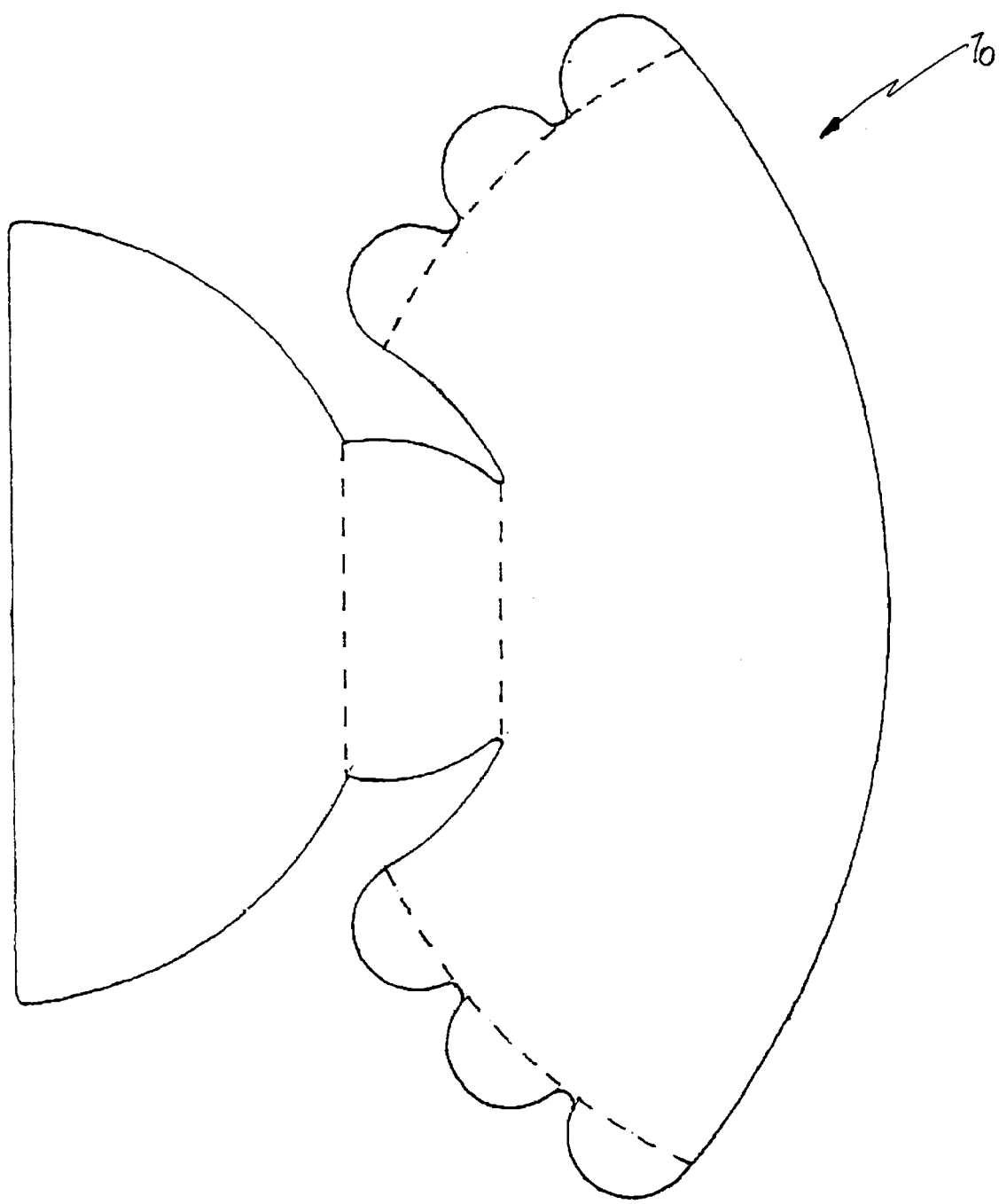
FIG. 30 is a view of a further preferred form of a blank, similar to that shown in FIG. 26.

FIG. 29 illustrates a further detailed view of the blank of FIG. 26. If the rear edges 43,44 of the second front section 38 were to be curved around to follow the corresponding periphery of the back section 34, as indicated by the phantom lines, then point 50 on the second front section 38 would correspond to point 52 on the back section 34. Instead, the shape of the blank is such that the second front section 38 is extended as shown in FIG. 29 so that point 54 meets with point 52 on the back section. The rear edges 43,44 of the second front section 38 must therefore be gathered or drawn inwards and/or the overlap sections 40,42 stretched to achieve the specified fit. This is required to achieved the desired spherical fullness to the assembled liner. The overlap sections 40,42 are stapled near to the rear edges of the second front section 38.

Similarly, point 58 on the first front section 36 would normally meet with point 57 on the second front section 38. Instead, point 58 meets with point 59. The forward edges of the second front section 3 8 must therefore be gathered and/or the adjacent edges of the first front section 36 stretched to achieve the required fit and accordingly obtain the desired fullness for the assembled liner 32. The joins are secured by staples.

On assembly, the overlap portions 46,48 of the first front section 36 are joined to the second front section followed by the joining of the back section 34 to the second front section 38. Staples are used to secure the joins and hold the liner in the assembled configuration.

It will be appreciated that the blank illustrated in FIGS. 26 and 29 need not be of integral construction and could be constructed of two or more parts. For example, the back section 34 could be formed as a discrete component of the liner with appropriate joining tabs provided on either the back section or the second front section. Additionally, the first and second front sections 36,36 could also be discrete.

Once the liner, in whatever form, has been assembled into a three dimensional form, the treatment of the outer surface of such a complete liner with moisture to a sufficient degree allowing the reconstitution of the outer section of the sphagnum moss gives an enhanced visual appearance making it easily possible for a prospective customer to recognise the liner as having been formed from sphagnum moss. It is desirable to ensure treatment allows only the required partial reconstitution of the liner and of course this step can be more easily controlled using the form of the invention where there is a water resistant layer.

Figure 31:
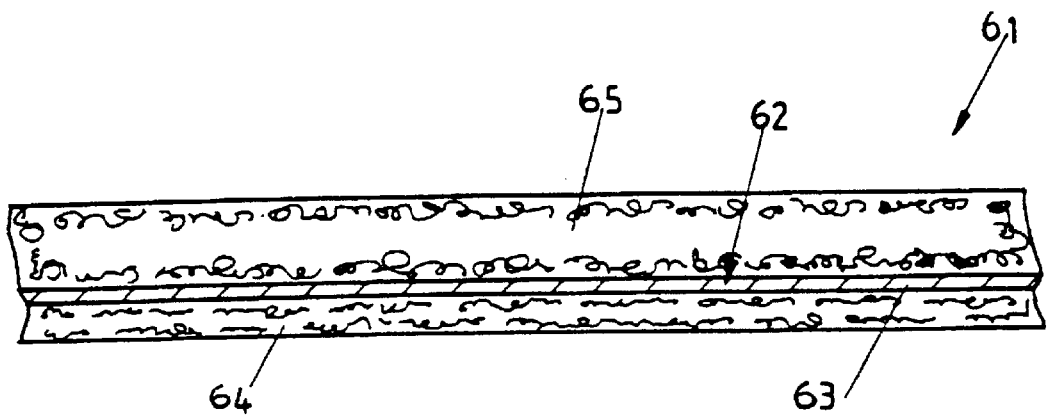
FIG. 31 is a section through a plant container liner manufactured according to an aspect of the present invention.
Figure 32:
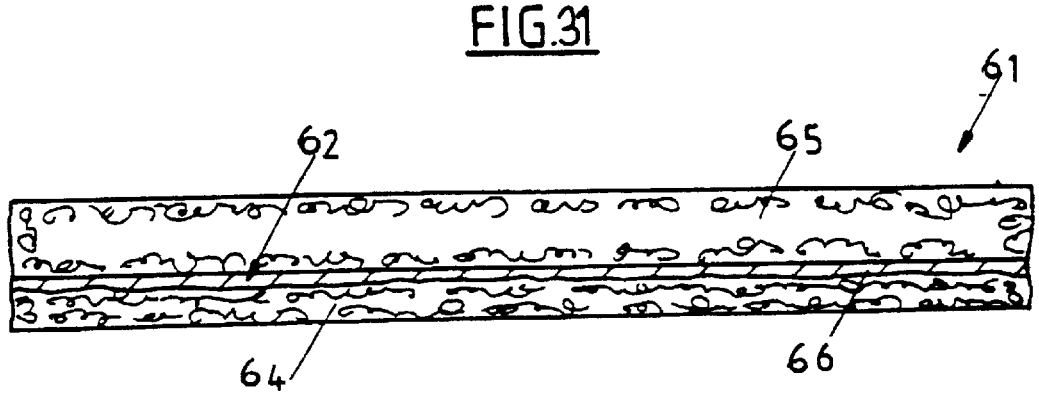
FIG. 32 is a section through an alternative plant container liner.

The incorporation of a water resistant layer into a plant container liner is illustrated in FIGS. 31 and 32. The liner is formed from a sheet 61 which may be primary comprised of dried plant material in layers 64 and 65 such as coconut fibre or sphagnum moss. Where moss is used, preferably the moss has the moisture content reduced so that it can be compressed into a sheet form. The moisture level has not been reduced to a degree that the moss itself has an unacceptable brittleness or inability to reconstitute.

The sheet 61 has incorporated towards one surface a layer of water resistant or water impervious material 62. In one form this barrier can be provided by a layer of paper 63 or suitable plastics material with one or both surfaces, if required, treated to facilitate adhesion to the sphagnum moss when compressed.

Desirably a thin layer of sphagnum moss 64 is placed in a mould, the barrier placed in position and the remaining mat 65 of sphagnum moss placed over the barrier 62 prior to compression. Thus, once compressed, the sheet of sphagnum moss has an outward appearance of a normal compressed sheet of sphagnum moss but has a water resistant barrier 62 towards one surface thereof.

In FIG. 32 the barrier is provided by treating a layer of the moss with a suitable substance. The first layer 4 of moss fibrous plant material placed in the mould may be treated by spraying a thermo setting plastic material. Any curable plastic mixture could be applied depending upon whether the sheet was to be hot or cold pressed.

Where the sheet is a liner for a plant container, the sheet can be formed using the moulds described in connection with FIGS. 3 to 12. Alternatively, the sheet may be formed using a roll press with the prepared bed of sphagnum moss passing through one or a series of rollers to form the desired compaction of the sphagnum moss. Where it is desirable for the end use of the material to be laid over a large surface, the more continuous form of compressing would be an advantage with the completed product delivered in rolls which could be easily handled when covering larger surface areas.

One such application of the invention would be to provide an undersurface for a lawn in arid or semi-arid conditions with the water resistant or substantially impervious layer provided in the sheet. The sheet according to the present invention will retain moisture allowing an even watering of an area, for example, of lawn with the application of a subterranean watering system using the drip feed technique. The result achieved in the present invention provides an evenness of moisture over the area of lawn and this can be contrasted with an area of lawn on an untreated bed of sphagnum moss where the moisture pattern throughout the watered area is uneven. This is because the barrier in the sheet according to the present invention operates to restrict movement of water allowing the moss to become saturated. It is recognised that sphagnum moss presents a desirable environment for root growth.

Figure 16:
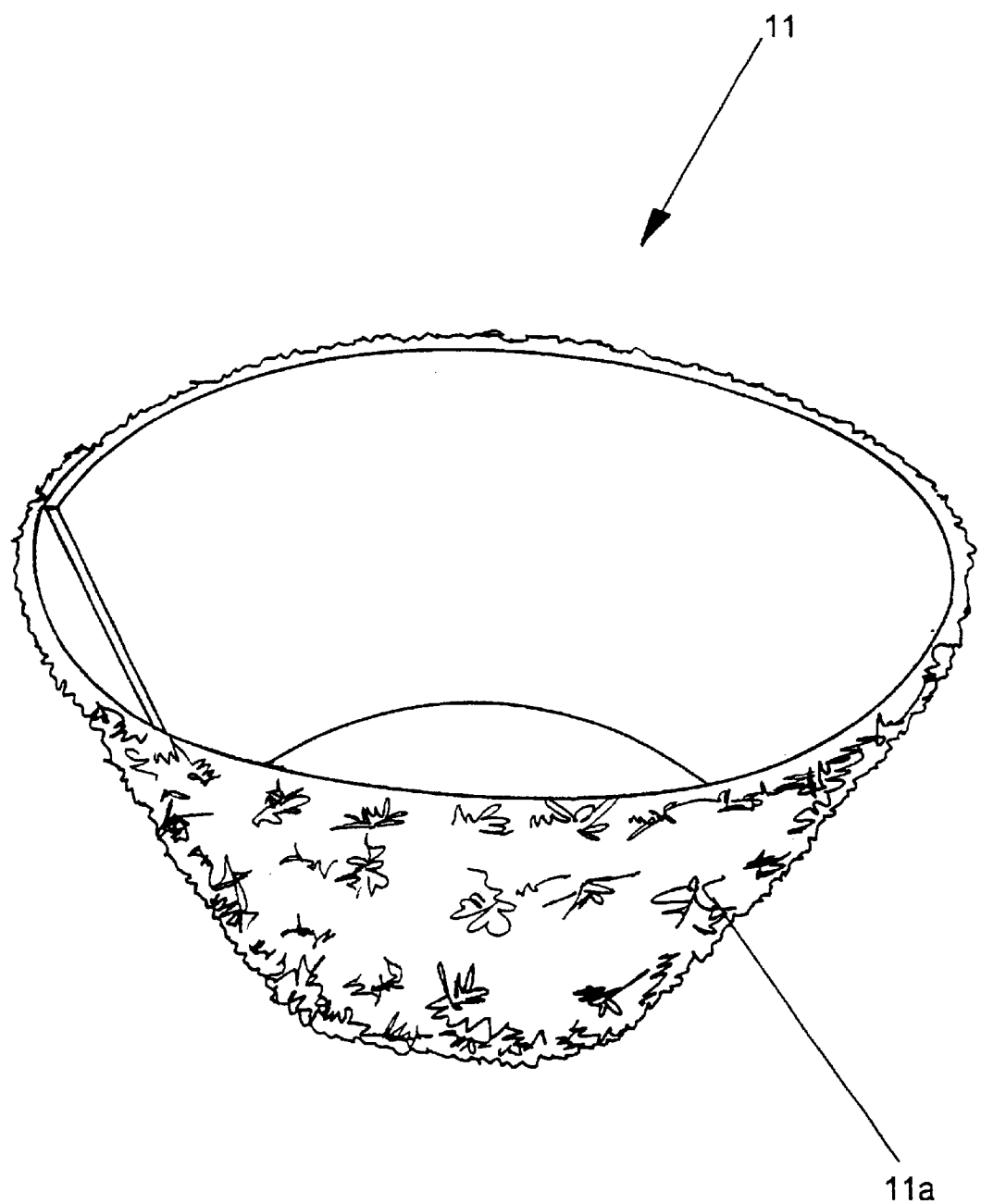
FIG. 16 is a perspective view of the three dimensional liner shown in FIG. 15 with the surface of the exterior of the liner partially reconstituted.

Hot and cold pressing creates different reconstitution characteristics in a compressed sphagnum moss sheet. Hot pressing establishes a longer reconstitution time whereas with cold pressing reconstitution occurs much more rapidly. When the liner 11 as illustrated in FIG. 16 is folded into the basket and the moss reconstitutes, the expansion caused by reconstitution and the forces generated through that expansion tend to compress the joints thereby restricting the amount of moisture which will be lost through these joints. While the openings allow for appropriate drainage to avoid stagnation problems they do restrict the amount of moisture which is able to penetrate to the outer surface of the compressed sphagnum moss sheet. This means that the visual appearance of the liner is retained and does not visually deteriorate as with conventional sphagnum moss liners. In conventional liners, moisture in the outer surface of the moss causes a green algae growth giving a visually less pleasant appearance.

One of the greatest causes for moisture loss from the hanging basket is the evaporation surface created by the outer surface of a conventional liner. This evaporation is accentuated in any conditions where there is a draft or movement of air but with the present invention because of the water resistant barrier, such evaporation is minimised thereby retaining moisture within the hanging basket.

With the significant reduction of water loss it is not necessary for the hanging baskets to be watered as regularly to retain optimum growing conditions. With conventional basket liners and untreated sphagnum moss liners it is frequently necessary to water the plants at least daily and sometimes more than once a day depending upon ambient conditions to preserve a healthy environment for the plant. With the present invention the watering programme can be modified and while conditions will determine the required maintenance, much greater gaps between watering are possible.

What is claimed is:

1. A method of forming a plant container liner and of presenting the plant container liner for sale, the method comprising:

attaching a first layer of dried sphagnum moss to one side of a layer of water resistant material and a second layer of dried sphagnum moss to an opposite side of said layer of water resistant material, said layer of water resistant material having a thickness less than the thickness of either of said layers of sphagnum moss, compressing the composite material comprising the layers of dried sphagnum moss and water resistant layer sandwiched therebetween, forming the composite material into a plant container liner having three dimensional form and comprising a base portion, a top opening into an internal cavity of the liner and one or more walls extending in upstanding configuration from the base portion to the opening, and applying water to the sphagnum moss on the exterior of the plant container liner to at least partially reconstitute said sphagnum moss on the exterior of the liner before displaying the liner for sale.

2. A method according to claim 1 wherein the sphagnum moss is attached to the water resistant layer by adhesive.

3. A method of forming a plant container liner having three dimensional form and comprising a base portion, a top opening into an internal cavity of the liner and one or more walls extending in an upstanding configuration from the base portion to the opening, and of presenting the plant container liner for sale, the method comprising:

attaching a first layer of sphagnum moss to one side of a layer of water resistant material, said first layer of sphagnum moss being thicker than said layer of water resistant material and, either before or after attaching said first layer, attaching a second layer or sphagnum moss, which second layer is thinner than said first layer of sphagnum moss, to an opposite side of said layer of water resistant material, said second layer of sphagnum moss being attached to said water resistant material so that said second layer of sphagnum moss is on an exterior of the wall(s) of the liner opposite said internal cavity of the liner, and before or after attaching either layer of sphagnum moss compressing the sphagnum moss and drying or at least partially drying the sphagnum moss so that it is reconstitutable, and applying water to the second layer of sphagnum moss to at least partially reconstitute the second layer of sphagnum moss before presenting the liner for sale.

4. A method according to claim 3 wherein the water resistant layer comprises a layer of paper.

5. A method according to claim 3 wherein the water resistant layer comprises a layer of metal foil.

6. A method according to claim 3 wherein the water resistant layer comprises a layer of a plastic material.

7. A method according to claim 3 wherein the sphagnum moss is attached to the water resistant layer by adhesive.

8. A method according to claim 4 wherein the sphagnum moss is attached to the water resistant layer by adhesive.

9. A method according to claim 5 wherein the sphagnum moss is attached to the water resistant layer by adhesive.

10. A method according to claim 6 wherein the sphagnum moss is attached to the water resistant layer by adhesive.

11. A method according to claim 6 wherein the plastics material comprises a thermoset plastic material, and includes heating the thermoset plastic material while attaching the moss to the water resistant layer.

12. A method according to claim 3 wherein the water resistant layer has a surface coating of a contact adhesive on either side thereof, and including adhering the first and second layers of sphagnum moss by bringing the moss into contact with said contact adhesive.

13. A method according to claim 3 including drying said sphagnum moss before attaching the dried sphagnum moss to the water resistant layer.

* * * * *

UNITED STATES PATENT AND TRADEMARK OFFICE
CERTIFICATE OF CORRECTION

PATENT NO. : 6,722,081 B1
DATED : April 20, 2004
INVENTOR(S) : Bradley et al.

It is certified that error appears in the above-identified patent and that said Letters Patent is hereby corrected as shown below:

Title page,
Item [56], References Cited, U.S. PATENT DOCUMENTS, change "2,723,169" to -- 2,728,169 --

Column 5,
Line 61, change "314613/314825." to -- 314613/314825, --

Column 7,
Line 17, change "the interior of the or the top liner" to -- the interior of the top liner --
Lines 18-19, change "the interior of the or the top liner" to -- the interior of the top liner --

Column 12,
Line 55, change "when assembled is," to -- when assembled, is --

Column 13,
Line 62, after "required to" change "achieved" to -- achieve --

Column 14,
Line 2, after "front section" change "3 8" to -- 38 --
Line 32, before "comprised of" change "primary" to -- primarily --

Column 16,
Line 23, before "sphagnum" change "or" to -- of --

Signed and Sealed this

Twelfth Day of October, 2004

JON W. DUDAS
*Director of the United States Patent and Trademark Office*